United States Patent Office 3,501,503
Patented Mar. 17, 1970

3,501,503
[4-(2,3-EPOXYALKANOYL)PHENOXY]ACETIC ACIDS
Edward J. Cragoe, Jr., Lansdale, and Otto W. Woltersdorf, Jr., Chalfont, Pa., assignors to Merck & Co., Inc., Rahway, N.J., a corporation of New Jersey
No Drawing. Filed Sept. 12, 1967, Ser. No. 667,066
Int. Cl. C07d 1/20, 1/22
U.S. Cl. 260—348                11 Claims

ABSTRACT OF THE DISCLOSURE

[4-(2,3-epoxyalkanoyl)phenoxy]acetic acids which may be substituted at the 2-carbon of the alkanoyl chain by a lower alkyl, trifluoromethylalkyl, cycloalkyl, aryl or aralkyl radical and which may also contain in the benzene ring one or more substituents selected from the group consisting of halogen and lower alkyl or a divalent hydrocarbylene chain such as trimethylene, tetramethylene or 1,3-butadienylene. Also include are the salts, esters and amide derivatives of the said acids. The products are diuretic and saluretic agents which are useful in the treatment of conditions associated with electrolyte and fluid retention.

The [4-(2,3-epoxyalkanoyl)phenoxy]acetic acids are obtained by treating an appropriate [4-(2-alkylidenealkanoyl)phenoxy]alkanoic acid with a reagent capable of oxidizing the alkylidene group therein to the corresponding epoxide. Suitable reagents include, for example, hydrogen peroxide and the per acids such as peracetic acid, performic acid, etc.

---

This invention relates to a new class of chemical compounds which can be described generally as [4-(2,3-epoxyalkanoyl)phenoxy]acetic acids and to the nontoxic, pharmacologically acceptable salts, esters and amide derivatives thereof.

Also, it is an object of this invention to describe a novel method of preparation for the [4-(2,3-epoxyalkanoyl)-phenoxy]acetic acids, their salts, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The [4-(2,3-epoxyalkanoyl)phenoxy]acetic acids of this invention are compounds having the following structural formula:

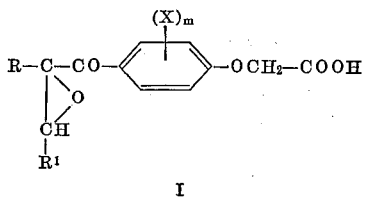

I wherein R is hydrogen, alkyl, for example, lower alkyl such as methyl, ethyl, propyl, isopropyl, butyl, pentyl, etc., trifluoromethyl substituted lower alkyl, for example, 2,2,2-trifluoroisopropyl, etc., cycloalkyl, for example, mononuclear cycloalkyl containing from 5–6 nuclear carbon atoms such as cyclopentyl, cyclohexyl, etc., aryl, for example, mononuclear aryl such as phenyl, p-tolyl, etc., or aralkyl, for example, mononuclear aralkyl such as benzyl, 4-n-propylbenzyl, etc.; $R^1$ is hydrogen or lower alkyl, for example, methyl, ethyl, etc.; the X radicals are similar or dissimilar members selected from hydrogen, halogen, for example, chlorine, bromine, fluorine, iodine, etc., lower alkyl, for example, methyl, ethyl, etc. or, taken together, two X radicals on adjacent carbon atoms of the benzene ring may be joined to form an hydrocarbylene chain (i.e., a divalent organic radical composed solely of carbon and hydrogen) containing from 3–4 carbon atoms between their points of attachment, for example, trimethylene, tetramethylene, 1,3-butadienylene, i.e., —CH=CH—CH=CH—, etc.; and $m$ is an integer having a value of 1–4; and the nontoxic, pharmacologically acceptable acid addition salts, lower alkyl esters, amide, lower alkylamide and di-lower alkylamide derivatives thereof.

A preferred embodiment of this invention relates to [4-(2,3-epoxyalkanoyl)phenoxy] acetic acids having the following structural formula:

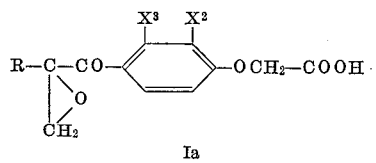

Ia wherein R is lower alkyl and $X^2$ and $X^3$ are similar or dissimilar members selected from hydrogen, halogen and lower alkyl; and the acid addition salts, lower alkyl ester, amide, lower alkylamide and di-lower alkylamide derivatives thereof. The foregoing class of compounds exhibits particularly good diuretic and saluretic activity and represents a preferred subgroup of compounds within the scope of this invention.

The instant products are prepared by the reaction of a [4-(2-alkylidenealkanoyl)phenoxy] alkanoic acid (II, infra) with a reagent which is capable of oxidizing the alkylidene group therein to the corresponding epoxide. The choice of a suitable reagent is within the skill of the artisian to select and include, for example, hydrogen peroxide, particularly when used with a strong base and those reagents which are commonly referred to as the "per" acids such as peracetic acid, performic acid and meta-chloroperbenzoic acid in an appropriate solvent such as chloroform or dichloromethane. When hydrogen peroxide is the reagent employed it is advantageous that the process be conducted in the presence of a slight excess of a strong base so that the reaction mixture may be maintained in a slightly basic condition, and the [4-(2,3-epoxyalkanoyl)phenoxy]acetic acid salt thus obtained may then be isolated as a product of the invention or, if desired, the said salt may be converted in the conventional manner by treatment with an aqueous solution of an acid to yield the corresponding carboxylic acid product. Suitable bases which may be used in the process include, for example, the alkali metal hydroxides such as sodium hydroxide, potassium hydroxide, etc. The following equation illustrates the process of this invention; however, it is to be understood that the hydrogen peroxide and sodium hydroxide reactants depicted therein are only illustrative of the reagents which may be employed and that other, functionally equivalent, oxidizing agents may also be employed in an analogous manner to obtain an identical product:

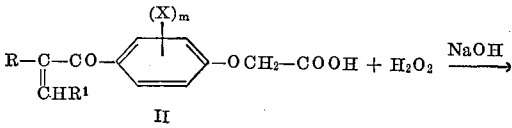

II

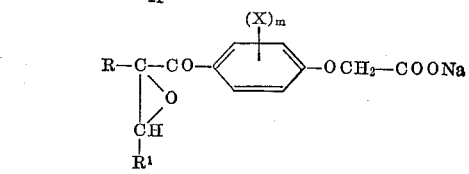

Ib

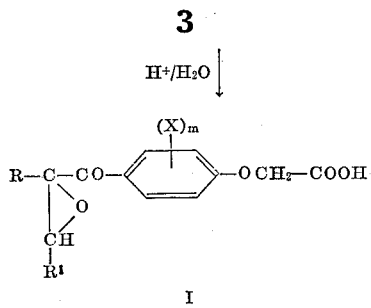

$H^+/H_2O \downarrow$

R—C—CO—⟨(X)$_m$⟩—OCH$_2$—COOH
   \ /
    O
    |
    CH
    |
    R$^1$

I wherein H+ is the cation derived from an organic or inorganic acid, for example, hydrochloric acid and R, R$^1$, X and m are as defined above.

The [4-(2,3 - epoxyalkanoyl)phenoxy]acetic acids of this invention and their corresponding salts, esters and amides are generally obtained as crystalline solids and, if desired, may be purified by recrystallization from a suitable solvent such as butyl chloride, etc. or from a mixture of solvents.

The [4 - (2 - alkylidenealkanoyl)phenoxy]acetic acids (II) employed as starting materials in the process of this invention are the subject of U.S. Patent No. 3,255,241, issued June 7, 1966, and the [4-(2-alkylidenealkanoyl) naphthyloxy]acetic acids which are also employed as starting materials in the instant process are disclosed in U.S. Patent No. 3,255,242, also issued June 7, 1966.

When hydrogen peroxide and a strong base are employed as the oxidizing medium in the process of this invention the basic condition of the reaction mixture results in the in situ formation of the carboxylate salts of the instant products. If desired the [4-(2,3-epoxyalkanoyl) phenoxy]acetic acid salts thus obtained may then be purified and isolated as products or, alternatively, the salts may be converted by treatment with an aqueous solution of an acid to obtain the corresponding carboxylic acid derivative.

In addition to the foregoing method the salts of the instant products (I) may also be obtained from the [4-(2,3-epoxyalkanoyl)phenoxy]acetic acid products (I), per se, by methods which are well known to those skilled in the art as, for example, by treating the said acids (I) with a base having a pharmacologically acceptable cation. Suitable bases include, for example, alkali metal and alkaline earth metal hydroxides, carbonates, etc, primary, secondary and tertiary amines, such as monoalkylamines, dialkylamines, trialkylamines, nitrogen containing heterocyclic amines, for example, piperidine.

Also, the ester and amide derivatives of the instant products (I) may be synthesized by substituting the appropriate ester and amide derivatives of [4-(2-alkylidenealkanoyl)phenoxy]acetic acid as starting materials in the process of this invention.

The foregoing and other equivalent methods for the preparation of the salts, esters and amides of the instant products (I) will be apparent to those having ordinary skill in the art and, to the extent that the said derivatives are nontoxic and physiologically acceptable to the body system the said esters and amides are the functional equivalent of the corresponding [4-(2,3-epoxyalkanoyl)phenoxy]acetic acids (I).

The examples which follow illustrate the [4-(2,3-epoxyalkanoyl)phenoxy]acetic acids (I) of the invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

[2,3-dichloro-4-(2,3-epoxy-2-ethylpropionyl)phenoxy] acetic acid

A stirred suspension of [2,3-dichloro-4-(2-methylenebutyryl)phenoxy]acetic acid (18.2 g., 0.06 mole) in ethyl alcohol (200 ml.) containing 10 N sodium hydroxide (9.6 ml.) is warmed to 40° C. and treated with 30% hydrogen peroxide (18.4 ml.) over a period of five minutes. The reaction mixture is stirred at room temperature for one hour, cooled to 5° C. and the [2,3-dichloro-4-(2,3-epoxy-2-ethylpropionyl)phenoxy]acetic acid sodium salt which separates (12.0 g., 59%) is then separated by filtration and dried. The sodium salt is then dissolved in water (100 ml.), acidified with hydrochloric acid, extracted into ether, washed with water and dried over magnesium sulfate. After removal of the solvent by distillation under reduced pressure there is thus obtained [2,3-dichloro - 4 - (2,3 - epoxy - 2 - ethylpropionyl)phenoxy] acetic acid (6.2 g.) which melts at 113.5–115.5° C. following recrystallization from butyl chloride.

Analysis.—Calc'd for $C_{13}H_{12}Cl_2O_5$ (percent): C, 48.92; H, 3.79; Cl, 22.22. Found (percent): C, 48.73; H, 3.73; Cl, 22.01.

EXAMPLE 2

[2,3-dichloro-4-(2,3-epoxypropionyl)phenoxy] acetic acid

Step A: 2,3-dichloro-4-(3-chloropropionyl)phenol.— A one-liter, four-necked flask fitted with a mechanical stirrer, thermometer, reflux condenser and Gooch tubing is charged with 2,3-dichloroanisole (71 g., 0.40 mole), methylene chloride (300 ml.) and 3-chloropropionyl chloride (76.5 g., 0.60 mole). The stirred reaction mixture is cooled in ice to 5° C. and aluminum chloride (80 g., 0.60 mole) is added during a ½-hour period. The reaction mixture is then stirred at 5° C. for two hours, and the methylene chloride is removed by distillation. Additional methylene chloride (150 ml.) is then added to the reaction and removed by distillation. Again methylene chloride (200 ml.) is added together with aluminum chloride (80 g., 0.60 mole) and the reaction mixture is refluxed for six hours.

The reaction mixture is cooled and poured onto an excess of ice (2 kg.) containing concentrated hydrochloric acid (70 ml.). The product is extracted with ether (500 ml.), washed with water and dried over magnesium sulfate. The solvents are then removed by distillation under reduced pressure and the residual viscous liquid is triturated with benzene (200 ml.) to yield 34.5 g. (34%) of 2,3-dichloro-4-(3-chloropropionyl)phenol which melts at 109.5–111.5° C. after recrystallization from carbon tetrachloride (200 ml.).

Analysis.—Calc'd for $C_9H_7Cl_3O_2$ (percent): C, 42.63; H, 2.78; Cl, 41.96. Found (percent): C, 42.99; H, 2.77; Cl, 42.70.

Step B: 2,3-dichloro-4-acryloylphenol.—To a solution of 2,3-dichloro-4-(3-chloropropionyl)phenol (2.53 g., 0.01 mole) in methanol (15 ml.) is added a solution of potassium acetate (0.98 g., 0.01 mole) in methanol (15 ml.). The reaction mixture is heated at reflux for 15 minutes, cooled, treated with chloroform (100 ml.) and then washed three times with 100 ml. portions of water. The chloroform extract is dried over magnesium sulfate and the solvent removed by distillation at reduced pressure to yield 1.7 g. (79%) of white colored 2,3-dichloro-4-acryloylphenol which melts at 136.5–138.5° C. following recrystallization from carbon tetrachloride.

Analysis.—Calc'd for $C_9H_6Cl_2O_2$ (percent): C, 49.80; H, 2.79; Cl, 32.67. Found (percent): C, 49.43; H, 2.94; Cl, 32.83.

Step C: (2,3-dichloro-4-acryloylphenoxy)acetic acid.— To a solution of 2,3-dichloro-4-acryloylphenol (4.85 g., 0.0224 mole) and iodoacetic acid (4.5 g., 0.024 mole) in acetone (200 ml.) is added anhydrous potassium carbonate (3.33 g., 0.024 mole). The reaction mixture is then refluxed for 20 hours and cooled. The white salt which separates is removed by filtration, dissolved in water (100 ml.) and then acidified with concentrated hydrochloric acid. The product which precipitates is extracted with chloroform (100 ml.), washed with water, dried over magnesium sulfate and the solvent removed by distillation at reduced pressure. The (2,3-dichloro-4-acryloylphenoxy)acetic acid thus obtained (2.2 g., 36%) melts at 111.5–113.5° C. following recrystallization from carbon tetrachloride.

*Analysis.*—Calc'd for $C_{11}H_8Cl_2O_4$ (percent): C, 48.03; H, 2.93; Cl, 25.78. Found (percent): C, 47.96; H, 3.06; Cl, 25.82.

Step D: [2,3-dichloro-4-(2,3-epoxypropionyl)phenoxy]acetic acid.—By substituting [2,3-dichloro-4-(2-methylenebutyryl)phenoxy]acetic acid employed in Example 1 with 16.5 g. (0.06 mole) of (2,3-dichloro-4-acryloylphenoxy)acetic acid and carrying out the reaction as described in Example 1 there is obtained [2,3-dichloro-4-(2,3-epoxypropionyl)phenoxy]acetic acid.

EXAMPLE 3

[2,3-dichloro-4-(2,3-epoxy-2-ethylpropionyl)phenoxy] acetamide

A stirred suspension of [2,3-dichloro-4-(2-methylenebutyryl)phenoxy]acetamide (18.1 g., 0.06 mole) in ethyl alcohol (300 ml.) containing 10 N sodium hydroxide (3.6 ml.) is warmed at 40° C. and treated with 30% hydrogen peroxide (18.4 ml.) over a period of five minutes. The reaction mixture is then stirred at room temperature for an hour, cooled to 5° C. and diluted with water (300 ml.). The precipitated solid is removed by filtration, washed with water, dried and recrystallized from benzene to yield [2,3-dichloro-4-(2,3-epoxy-2-ethylpropionyl)phenoxy]acetamide in the form of a white crystalline solid.

In a manner similar to that described in Example 1 for the preparation of [2,3-dichloro-4-(2,3-epoxy-2-ethylpropionyl)phenoxy]acetic acid all of the products of the invention may be obtained. Thus, by substituting the appropriate [4-(2-alkylidenealkanoyl)phenoxy]alkanoic acid for the [2,3-dichloro-4-(2-methylenebutyryl)phenoxy]acetic acid recited in Example 1 and conducting the reaction under the same conditions and with the same molar quantities of reactants as described therein all of the [4-(2,3-epoxyalkanoyl)phenoxy]acetic acids (I) of this invention may be obtained. The following equation illustrates the reaction of Example 1 and, together with Table I, depict the starting materials of the instant process and the products (I) derived therefrom:

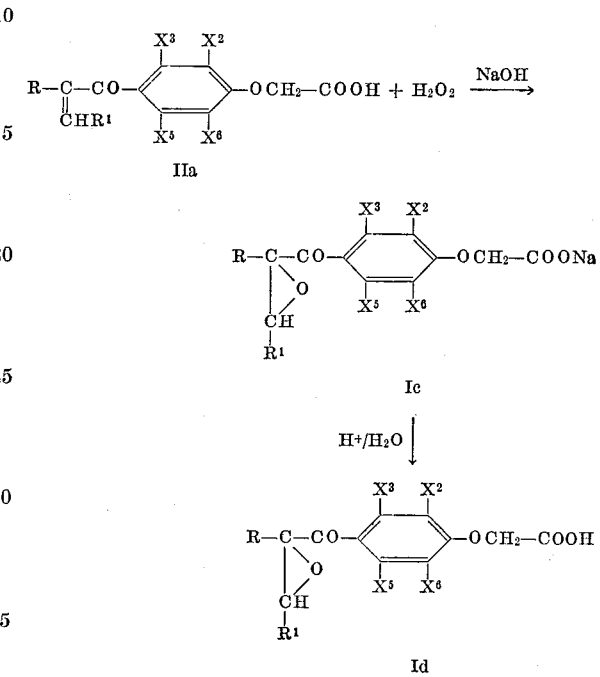

TABLE I

| Ex. | R | $R^1$ | $X^2$ | $X^3$ | $X^5$ | $X^6$ |
|---|---|---|---|---|---|---|
| 4 | $-C_2H_5$ | H | H | Cl | H | H |
| 5 | $-C_2H_5$ | H | $-CH_3$ | $-CH_3$ | H | H |
| 6 | $-C_2H_5$ | H | $-CH=CH-CH=CH-$ | | H | H |
| 7 | $-C_2H_5$ | H | Cl | $-CH_3$ | H | H |
| 8 | $-C_2H_5$ | H | $-CH_3$ | Cl | H | H |
| 9 | $-CH(CF_3)(CH_3)$ | H | H | $-CH_3$ | H | H |
| 10 | $-CH(CH_3)_2$ | H | H | Cl | H | H |
| 11 | $-C_2H_5$ | H | H | $-CH_3$ | H | H |
| 12 | $-CH(CH_3)_2$ | H | Cl | Cl | H | H |
| 13 | $-C_2H_5$ | $-CH_3$ | Cl | Cl | H | H |
| 14 | $-CH_3$ | $-CH_3$ | Cl | Cl | H | H |
| 15 | $-C_2H_5$ | H | $-CH_2-CH_2-CH_2-$ | | H | H |
| 16 | -CH(CH₂-CH₂-CH₂-CH₂) (cyclopentyl) | H | H | Cl | H | H |
| 17 | -CH(CH₂-CH₂-CH₂-CH₂-CH₂) (cyclohexyl) | H | Cl | Cl | H | H |
| 18 | -phenyl | H | H | Cl | H | H |
| 19 | $-CH_3$ | $-C_2H_5$ | H | Cl | H | H |
| 20 | $-(CH_2)_2CH_3$ | $-C_2H_5$ | H | Cl | H | H |
| 21 | $-CH_2-$phenyl | H | H | Cl | H | H |
| 22 | $-C_2H_5$ | H | H | Cl | Cl | H |
| 23 | $-C_2H_5$ | H | $-CH_3$ | $-CH_3$ | $-CH_3$ | $-CH_3$ |
| 24 | $-C_2H_5$ | H | $-CH_3$ | $-CH_3$ | $-CH_3$ | H |
| 25 | -phenyl-$(CH_2)_2CH_3$ | H | H | Cl | H | H |
| 26 | $-C_2H_5$ | H | $-CH_2-CH_2-CH_2-CH_2-$ | | H | H |
| 27 | $-C_2H_5$ | H | H | F | H | H |
| 28 | $-C_2H_5$ | H | H | I | H | H |
| 29 | $-C_2H_5$ | H | H | Br | H | H |
| 30 | $-(CH_2)_3CH_3$ | H | H | Cl | H | H |
| 31 | $-(CH_2)_4CH_3$ | H | H | Cl | H | H |
| 32 | H | $-CH_3$ | H | $-CH_3$ | H | H |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be administered by mixing 100 mg. of a [4-(2,3-epoxyalkanoyl)phenoxy]acetic acid (I) or a suitable salt, ester or amide derivative thereof, with 191 mg. of lactose and 9 mg. of magnesium stearate and placing the 300 mg. mixture into a No. 4 gelatin capsule. Similarly, by employing more of the active ingredient and less lactose, other dosage forms can be put up in No. 4 gelatin capsules and, should it be necessary to mix more than 300 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 33

Dry-filled capsules containing 100 mg. of active ingredient per capsule

| | Per capsule, mg. |
|---|---|
| [2,3 - dichloro - 4-(2,3-epoxy-2-ethyl-propionyl)phenoxy]acetic acid | 100 |
| Lactose | 191 |
| Magnesium stearate | 9 |
| Capsule size No. 4 | 300 |

The [2,3 - dichloro-4-(2,3-epoxy-2-ethylpropionyl)phenoxy]acetic acid is reduced to a No. 60 powder and lactose and magnesium stearate are passed through a No. 60 bolting cloth onto the powder and the combined ingredients admixed for 10 minutes and then filled into No. 4 dry gelatin capsules.

Similar dry-filled capsules can be prepared by replacing the active ingredient of the above example by any of one or more of the other novel compounds of this invention and varying the amounts of the ingredients to obtain the desired dosage.

It will be apparent from the foregoing description that the [4-(2,3-epoxyalkanoyl)phenoxy]acetic acid products (I) of this invention and the corresponding salt, ester and amide derivatives thereof constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:
1. A compound having the formula:

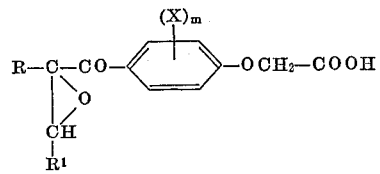

wherein R is hydrogen, alkyl, trifluoromethyl substituted lower alkyl, cycloalkyl, mononuclear aryl, mononuclear alkaryl or mononuclear aralkyl; $R^1$ is hydrogen or lower alkyl, the X radicals are similar or dissimilar members selected from hydrogen, halogen, lower alkyl or, taken together, two X radicals on adjacent carbon atoms of the benzene ring may be joined to form an hydrocarbylene chain containing from 3–4 carbon atoms between their points of attachment and $m$ is an integer having a value of 1–4; and the nontoxic, pharmacologically acceptable acid addition salts, lower alkyl esters, amide, lower alkylamide and dilower alkylamide derivatives thereof.

2. A compound according to claim 1 wherein R is alkyl and $m$ is an integer having a value of 1–2.

3. A compound according to claim 1 having the formula:

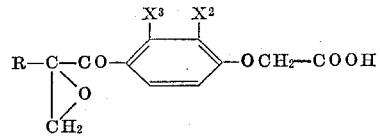

wherein R is lower alkyl and $X^2$ and $X^3$ are similar or dissimilar members selected from hydrogen, halogen and lower alkyl; and the nontoxic, pharmacologically acceptable acid addition salts, lower alkyl esters, amide, lower alkylamide and di-lower alkylamide derivatives thereof.

4. The compound of claim 3 wherein R is lower alkyl and $X^2$ and $X^3$ are halogen.

5. The compound of claim 3 wherein R is lower alkyl; $X^2$ is hydrogen and $X^3$ is halogen.

6. The compound of claim 3 wherein R is lower alkyl and $X^2$ and $X^3$ are lower alkyl.

7. The compound of claim 3 wherein R is lower alkyl and $X^2$ and $X^3$ are 1,3-butadienylene.

8. The compound of claim 3 wherein R is ethyl and $X^2$ and $X^3$ are chloro.

9. The compound of claim 3 wherein R is ethyl; $X^2$ is hydrogen and $X^3$ is chloro.

10. The compound of claim 3 wherein R is ethyl and $X^2$ and $X^3$ are methyl.

11. The compound of claim 3 wherein R is ethyl and $X^2$ and $X^3$ are joined to form a 1,3-butadienylene chain.

OTHER REFERENCES

Houben-Weyl, Methoden der Organischen Chemie, vol. VI/3 (1965), pp. 397–9.

NORMA S. MILESTONE, Primary Examiner

U.S. Cl. X.R.

424—278